US012565916B2

(12) United States Patent
Milanesi et al.

(10) Patent No.: US 12,565,916 B2
(45) Date of Patent: Mar. 3, 2026

(54) METHOD FOR MAKING A BRAKING BAND OF A BRAKE DISC, METHOD FOR MAKING THE BRAKE DISC, BRAKE DISC, AND BRAKING BAND FOR BRAKE DISC

(71) Applicants:Brembo S.p.A., Curno (IT); ENEA, Agenzia Nazionale Per Le Nuove Tecnologie, L'energia E Lo Sviluppo Economico Sostenible, Rome (IT)

(72) Inventors: Andrea Milanesi, Curno (IT); Giuseppe Magnani, Rome (IT); Federica Burgio, Rome (IT)

(73) Assignees: Brembo S.p.A., Curno, Bergamo (IT); ENEA, Agenzia Nazionale Per Le Nuove Tecnologie, L'energia E Lo Sviluppo Economico Sostenible, Rome (IT)

( * ) Notice: Subject to any disclaimer, the term of this patent is extended or adjusted under 35 U.S.C. 154(b) by 399 days.

(21) Appl. No.: 18/547,354

(22) PCT Filed: Feb. 22, 2022

(86) PCT No.: PCT/IB2022/051544
§ 371 (c)(1),
(2) Date: Aug. 22, 2023

(87) PCT Pub. No.: WO2022/180508
PCT Pub. Date: Sep. 1, 2022

(65) Prior Publication Data
US 2024/0125367 A1    Apr. 18, 2024

(30) Foreign Application Priority Data

Feb. 25, 2021    (IT) .......................... 102021000004451

(51) Int. Cl.
F16D 65/12        (2006.01)
B22D 19/00       (2006.01)
(Continued)

(52) U.S. Cl.
CPC ....... F16D 65/125 (2013.01); B22D 19/0081 (2013.01); B22D 21/007 (2013.01);
(Continued)

(58) Field of Classification Search
CPC .. F16D 65/125; F16D 65/127; F16D 2065/13; F16D 2200/0043;
(Continued)

(56) References Cited

U.S. PATENT DOCUMENTS 5,535,857 A * 7/1996 Barlow .................. B22D 19/14
                                                        188/218 XL
5,620,791 A * 4/1997 Dwivedi ............... C22C 1/1015
                                                        428/323

(Continued)

FOREIGN PATENT DOCUMENTS

WO        WO-2019123222 A1 * 6/2019 ............. B22D 19/00
WO        WO-2019123223 A1 * 6/2019 ......... C04B 35/6455

OTHER PUBLICATIONS

Italian Patent Office, Search Report in Application No. IT202100004451, dated Oct. 27, 2021, 2 pages, Munich.
(Continued)

*Primary Examiner* — Nicholas J Lane
(74) *Attorney, Agent, or Firm* — Marshall & Melhorn, LLC

(57)                ABSTRACT
A method for making a braking band (2) for a brake disc (1) for a disc brake, comprising the following steps: a) preparing a mold (10) having an inner cavity (11), which comprises a first portion (11a) of a shape corresponding to the braking band (2) to be made; b) preparing a band preform (20)
(Continued)

comprising a central layer (200) made of porous ceramic material comprising silicon carbide (SiC), an upper outer layer (201) and a lower outer layer (202), said upper outer layer (201) and said lower outer layer (202) being made of porous ceramic material comprising silicon carbide (SiC) and infiltrated with silicon (SiC+Si), said upper outer layer (201) and said bottom outer layer (202) being arranged in an opposing way and on opposite sides of the central layer (200); c) placing said band preform (20) inside the mold at the first portion (11a) of said inner cavity (11); and d) injecting a liquid or semi-solid aluminum alloy inside the entire inner cavity (11) of the mold (11) so as to infiltrate only the central layer (200) of said band preform (20) made of porous ceramic material with said aluminum alloy, obtaining at the first portion (11a) an aluminum metal matrix composite reinforced by said central preform (200) which defines the braking band (2) to be made. A braking band and a brake disc are made at least with the aforesaid method.

18 Claims, 6 Drawing Sheets

(51) Int. Cl.
    B22D 21/00       (2006.01)
    F16D 65/02       (2006.01)

(52) U.S. Cl.
    CPC ................ *F16D 2065/1308* (2013.01); *F16D 2065/132* (2013.01); *F16D 2200/003* (2013.01); *F16D 2200/0039* (2013.01); *F16D 2200/0082* (2013.01); *F16D 2250/0015* (2013.01)

(58) Field of Classification Search
    CPC .......... F16D 2200/0047; B22D 21/007; B22D 19/0081; C04B 2111/00913; C04B 2111/00931

See application file for complete search history.

(56)             References Cited

U.S. PATENT DOCUMENTS

| | | | | |
|---|---|---|---|---|
| 5,980,792 | A * | 11/1999 | Chamlee | B29C 41/52 |
| | | | | 264/40.6 |
| 7,267,882 | B2 * | 9/2007 | Breslin | C04B 35/652 |
| | | | | 501/96.3 |
| 11,187,290 | B2 * | 11/2021 | Paul | B22D 19/00 |
| 2003/0070891 | A1 * | 4/2003 | Nakao | B22D 17/007 |
| | | | | 188/218 XL |
| 2006/0085968 | A1 * | 4/2006 | Yamaguchi | B22D 17/24 |
| | | | | 29/527.1 |
| 2009/0317642 | A1 * | 12/2009 | Goller | C04B 41/87 |
| | | | | 427/307 |
| 2010/0001231 | A1 * | 1/2010 | Loukus | C04B 41/009 |
| | | | | 249/105 |
| 2014/0272451 | A1 * | 9/2014 | Loukus | B22D 19/02 |
| | | | | 188/218 XL |
| 2016/0108980 | A1 | 4/2016 | Moore et al. | |
| 2016/0169311 | A1 * | 6/2016 | Im | F16D 65/126 |
| | | | | 264/29.1 |
| 2021/0156440 | A1 * | 5/2021 | Pajak | F16D 69/023 |
| 2021/0205882 | A1 * | 7/2021 | Liu | B22F 10/00 |
| 2021/0364053 | A1 * | 11/2021 | Sarkisian | F16D 65/12 |

OTHER PUBLICATIONS

European Patent Office, International Search Report and Written Opinion in Application No. PCT/IB2022/051544, dated Jun. 27, 2022, 9 pages, Rijswijk, Netherlands.

* cited by examiner

20

201

200

202

1

**METHOD FOR MAKING A BRAKING BAND
OF A BRAKE DISC, METHOD FOR MAKING
THE BRAKE DISC, BRAKE DISC, AND
BRAKING BAND FOR BRAKE DISC**

FIELD

This invention relates to a method for making a braking band for a brake disc, a method for making a brake disc, a brake disc, and a braking band for a brake disc made by the aforesaid method.

BACKGROUND

A brake disc of a disc braking system of a vehicle comprises an annular structure, or braking band, and a central fixing element, known as a bell, by means of which the disc is attached to the rotating part of a vehicle suspension, for example a hub. The braking band is provided with opposing braking surfaces suitable for cooperating with friction elements (brake pads), housed in at least one gripper body placed astride said braking band and integral with a non-rotating component of the vehicle suspension. The controlled interaction between the opposing brake pads and the opposing braking surfaces of the braking band causes a braking action by friction which allows the vehicle to decelerate or stop.

Generally, the brake disc is made of gray cast iron or steel. In fact, these materials allow good braking performance (especially in terms of limiting wear) to be obtained at relatively low cost. Discs made of carbon or carbon-ceramic materials offer much higher performance, but at a much higher cost.

As an alternative to gray cast iron or steel discs, discs made of aluminum have been proposed in order to reduce the weight of the disc. Aluminum discs are equipped with protective coatings. The protective coating serves on the one hand to reduce the wear on the disc and thus ensures performance similar to cast iron discs, and on the other hand to protect the aluminum base from the temperatures generated during braking, which are well above the softening temperatures of aluminum (200-400° C.).

The protective coatings available today and applied to aluminum discs, while offering resistance to wear, are, however, often subject to flaking, which causes said coatings to detach from said disc. This complicates the production process of the disc. In effect, the disc must undergo surface finishing treatments and must also be prepared for connection to the bell.

It is obvious from that which is described above that aluminum or aluminum alloy discs with protective coatings are not currently able to completely replace steel or gray cast iron discs.

However, the lower density of aluminum with respect to both steel and gray cast iron keeps interest in aluminum very high among those in the braking systems industry as an excellent potential substitute for steel and gray cast iron.

In the sector in question, there is therefore a need for aluminum-based brake discs which on the one hand make it possible to exploit the special operational features of aluminum (first and foremost, due to its lower density) and on the other obtain mechanical strength and wear features that are at least comparable to steel or gray cast iron discs. There is also a need to make these discs with production processes that are as simple and economical as possible.

In WO2019/123222A1, a method is described for making aluminum discs with a porous ceramic preform, which is infiltrated with molten aluminum (liquid or semi-solid state). Unfortunately, the disc obtained in this way provides for direct contact between the brake pad and the aluminum-based metal matrix, which generates possible local degradation phenomena on the disc at the points where the aluminum is overheated by friction to its melting point.

SUMMARY

There is therefore a strong need in the industry for aluminum-based brake discs that do not degrade locally and that, on the one hand, make it possible to take advantage of the special operational features of aluminum (primarily lower density), and, on the other, obtain mechanical strength and wear features comparable to steel or gray cast iron discs, while at the same time being made with production processes that are as simple and economical as possible.

Together with the aforesaid requirements, there is also the need to have brake discs with greater resistance to corrosion with respect to cast iron or steel discs and with lower emission of polluting metal particles.

The aforesaid requirements are satisfied by a method for making a braking band of a brake disc, a method for making a brake disc, a brake disc for disc brakes, and a braking band according to the appended independent claims.

The method for making the braking band according to this invention comprises the following steps:

a) preparing a mold having an inner cavity which comprises a first portion of a shape corresponding to the braking band to be made;

b) preparing a band preform comprising a central layer made of porous ceramic material comprising silicon carbide (SiC), an upper outer layer, and a lower outer layer; said upper outer layer and said lower outer layer being made of porous ceramic material comprising silicon carbide (SiC) and infiltrated with silicon (SiC+Si); said upper outer layer and said lower outer layer being further arranged in an opposing manner and on opposite sides of the central layer;

c) placing the band preform inside the mold at the first portion of said inner cavity;

d) injecting a liquid or semi-solid aluminum alloy inside the entire inner cavity of the mold so as to infiltrate only the central layer of said band preform made of porous ceramic material with said aluminum alloy, obtaining at the first portion an aluminum metal matrix composite reinforced by said central layer which partially defines the braking band to be made.

Advantageously, for making the band preform, the method comprises the steps of:

a1) preparing a rough preform, made of porous ceramic material comprising silicon carbide (SiC), said rough preform having an upper face and an opposing lower face, joined together by a side wall incident to the upper and lower faces, e.g., the rough preform has a cylindrical or otherwise centrally hollow cylinder geometry (as shown in the figures), wherein the lower face and upper face are the bases of the cylindrical shape and the side wall is the side surface of the cylindrical shape;

a2) depositing a masking layer at least partially on the side wall suitable for preventing the infiltration of silicon (Si) in the subsequent step of infiltrating a3) through it;

a3) infiltrating the rough preform with silicon (Si) through the upper face and the lower face to a given depth, so as to obtain the band preform composed of a central layer not infiltrated with silicon, an upper outer layer infiltrated with silicon (SiC+Si) and a lower outer layer infiltrated with silicon (SiC+Si), said upper outer layer and said lower outer layer being arranged in an opposing manner and on opposite sides of the central layer.

Preferably, in step a2), the step of depositing the masking layer comprises the deposition of a boron nitride (BN) layer.

Advantageously, in step a2), the deposition of the masking layer is applied to the entire side wall and is not applied to the upper and lower faces of the rough preform.

Preferably, in step a3), the rough preform is placed in a crucible, a predetermined amount of silicon (Si) powder is added to the crucible, and the rough preform is heated to a temperature above 1414° C. for at least 5 minutes, at an atmospheric pressure and in inert atmospheres, preferably in an argon atmosphere.

Preferably, the rough preform is heated to a temperature of between 1500° C. and 1650° C. for a time interval of between 15 and 90 minutes.

Even more preferably, the rough preform is heated to a temperature of between 1550° C. and 1600° C. for a time interval of between 30 and 60 minutes.

Preferably, the rough preform has a thickness, i.e., a distance between the upper face and the lower face, of between 4 and 40 millimeters, ends included, even more preferably between 10 and 20 millimeters, and the predefined amount of silicon is determined according to the size of the preform so as to obtain at most a thickness of the upper outer layer and/or the lower outer layer of between 0.5 millimeters and 3 millimeters, preferably about 2 millimeters. Preferably, step d) of placing the aluminum alloy inside the mold is conducted according to a semi-solid or liquid infiltration technique or squeeze casting technique or by die casting with liquid aluminum.

In the case of gravity infiltration, the infiltration preferably takes place in an inert atmosphere, such as a nitrogen atmosphere.

Advantageously, the rough preform is obtained by sequentially subjecting a mass of granules made of ceramic material superficially coated with a polymeric binding composition to molding, dewaxing, and sintering.

Preferably, the sintering is conducted in two separate sintering cycles, wherein a first sintering cycle is conducted at a temperature of not less than 1600° C., preferably about 1800° C., and a second sintering cycle is conducted at a temperature of not less than 2000° C., preferably in the range of 2100° C.-2200° C., both in an inert atmosphere.

Further, preferably, in step d), the mold closes on the upper outer layer and on the lower outer layer of the band preform in such a way that, during the injection of aluminum into the mold, the infiltration of aluminum over the upper and lower outer layer is prevented, so that the outer braking surfaces of the braking band are free of aluminum.

The method for making a brake disc comprising a braking band and a bell according to this invention comprises the following steps:

a) preparing a mold having an inner cavity which comprises a first portion of a shape corresponding to the braking band of the brake disc to be made and a second portion of a shape corresponding to the bell of the brake disc to be made, wherein the first and second portions of said inner cavity are communicating with each other;

b) preparing a band preform comprising a core layer made of porous ceramic material comprising silicon carbide (SiC), an upper outer layer, and a lower outer layer (202); the upper outer layer and the lower outer layer are made of porous ceramic material comprising silicon carbide (SiC) and infiltrated with silicon (SiC+Si); the upper outer layer and the lower outer layer are arranged in an opposing manner and on opposite sides of the central layer;

c) placing the band preform within the mold at the first portion of said inner cavity;

d) injecting a liquid or semi-solid aluminum alloy within the entire inner cavity of the mold so as to infiltrate only the central layer of said band preform made of porous ceramic material with said aluminum alloy to obtain in the first portion an aluminum metal matrix composite reinforced by said central layer that partially defines the braking band of the brake disc to be made, and so as to fill the second portion with said aluminum alloy to obtain an aluminum alloy fusion that is connected with the braking band made of metal matrix composite and defines the bell of the brake disc to be made.

A disc brake according to this invention comprises a braking band and a bell connected to said braking band.

Preferably, in an advantageous way, the bell is connected in one piece with the braking band and is composed of a co-casting made of aluminum alloy with the metal matrix of the composite forming the braking band.

According to this invention, the braking band is composed of a central portion made of an aluminum metal matrix composite reinforced with ceramic material comprising silicon carbide (SiC). Said composite is obtained by infiltrating a central layer made of porous ceramic material comprising silicon carbide (SiC) of a rough preform with an aluminum alloy. The braking band is also composed of an upper portion that is joined to the central portion. Said upper portion is made of porous ceramic material comprising silicon carbide (SiC) and infiltrated with silicon (to form SiC+Si) and covers the central portion on one side thereof. The braking band is also composed of a lower portion that is joined to the central portion on the opposite side, i.e., opposed to the upper portion. Said lower portion is also made of porous ceramic material comprising silicon carbide (SiC) and infiltrated with silicon (to form SiC+Si). Further, the lower portion covers the central portion on the other side, i.e., opposite to the upper portion.

Preferably, the upper portion and the lower portion have a thickness between 2 and 4 millimeters.

Preferably, the aluminum alloy matrix has a homogeneously distributed structure within said composite.

DESCRIPTION OF THE FIGURES

Further features and advantages of this invention will become more apparent from the following detailed description of preferred, non-limiting embodiments thereof, wherein:

FIG. 7 shows the cross section of a rough brake disc made on a diametrical plane of the rough brake disc; the rough brake disc is an intermediate product immediately preceding the final brake disc shown in FIG. 1, said brake disc being obtained by removal of the unnecessary portions of the rough brake disc by subsequent machining.

Elements or parts of elements common to the embodiments described hereinafter will be indicated with the same reference numerals.

DETAILED DESCRIPTION

Figure 1:
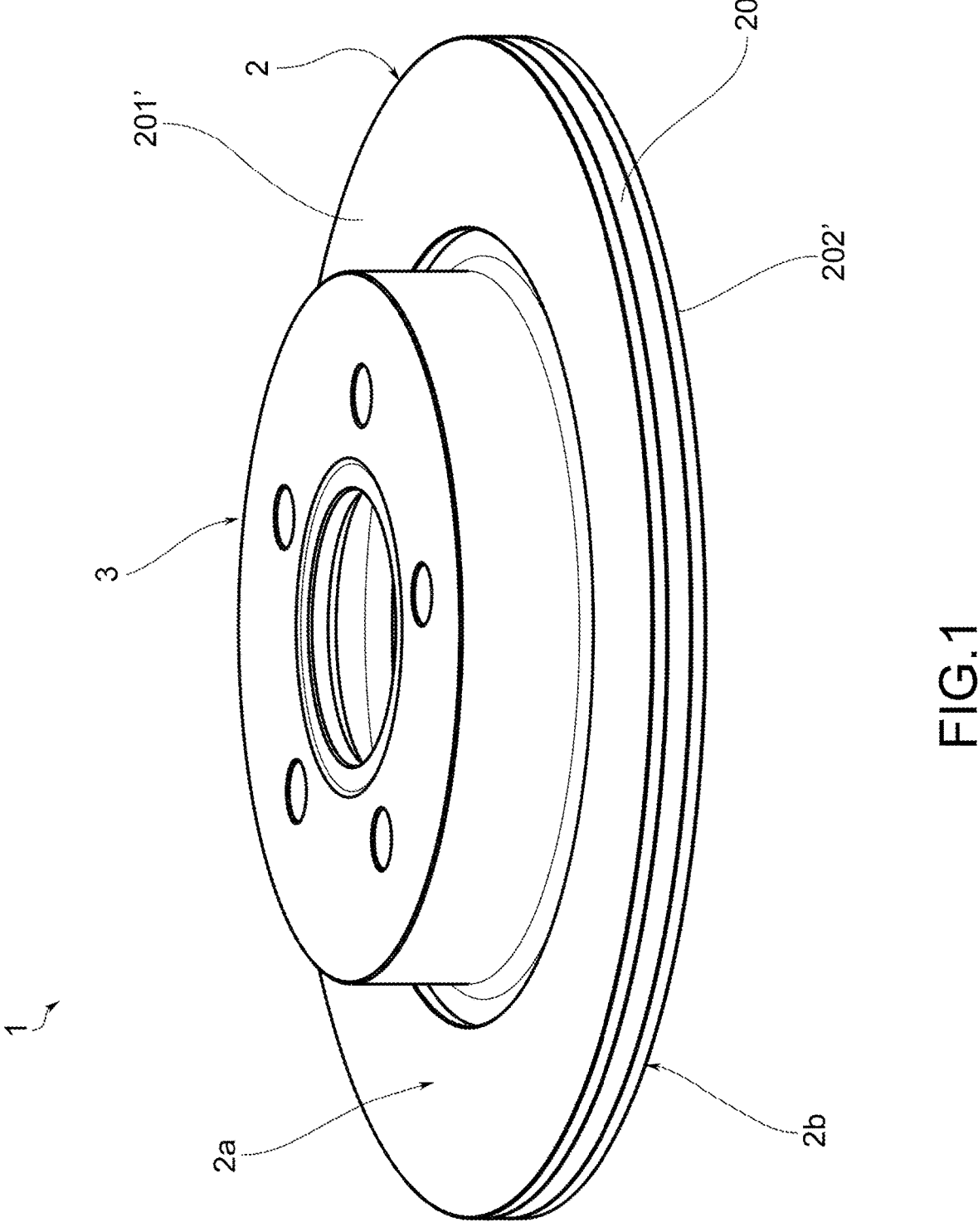
FIG. 1 is a perspective view of a brake disc according to an embodiment of the present invention.

With reference to the aforesaid figures, reference numeral 1 globally denotes a brake disc according to this invention.

According to a general embodiment of the invention, illustrated in the accompanying figures, the brake disc 1 comprises a braking band 2, provided with two opposing outer braking surfaces 2*a* and 2*b*, each of which at least partially defines one of the two main faces of the disc.

The brake disc 1 further comprises a bell 3, which is connected to the braking band 2.

According to a first aspect of the invention, the braking band 2 is composed of a central portion 200' made of an aluminum-based metal matrix composite reinforced with ceramic material comprising silicon carbide (SiC). Said composite is obtained by infiltrating a central layer of porous ceramic material comprising silicon carbide (SiC) of a rough preform 20' with an aluminum alloy.

The aforesaid composite falls under the category of composites known in the industry as MMC (metal matrix composite).

The use of said MMC composite comprising aluminum in the braking band 2 allows mechanical and chemical-physical features to be obtained that are even greater with respect to those of aluminum and at the same time (with respect to a simple fusion in aluminum or alloy thereof) adds functional features suitable for a heavy application such as that required in a braking system without needing protective coatings on the braking surfaces.

Further, the braking band 2 is also composed of an upper portion 201' which is joined to the central portion 200' in one piece, being obtained by silicon infiltration of a single initial rough preform 20', infiltrated to a given depth D1, which thus determines the thickness of the upper portion 201'. The upper portion 201' is thus made of porous ceramic material comprising silicon carbide (SiC) and infiltrated with silicon (SiC+Si). Further, the upper portion 201' covers the central portion 200' on one side thereof, so that on said side, the central portion 200' is not subjected to contact with the brake pads when the brake disc is mounted on the disc brake.

In other words, the upper portion 201' is a region of the initial rough preform 20', infiltrated with silicon to a given depth.

Additionally, the braking band 2 is composed of a lower portion 202' that is joined to the central portion 200' in one piece, being obtained by silicon infiltration of the single rough preform 20' to a given depth D2, preferably equal to D1, which determines, therefore, the thickness of the lower portion 202'. The lower portion 202' is thus also made of porous ceramic material comprising silicon carbide (SiC) and infiltrated with silicon (SiC+Si). Further, the lower portion 202' covers the central portion 200' on the other side, i.e., opposite to the upper portion 201'. In this way, the result is that the central portion 200' is interposed between the upper portion 201' and the lower portion 202'. In particular, the outer braking surfaces 2*a*, 2*b* of the braking band 2 are the outermost surfaces of the lower portion, of the upper portion 201', and of the lower portion 202', respectively, which are not joined, also in the sense of not being integrated, to the central portion 200'.

It is clear that the central portion 200' is interposed between the upper portion 201' and the lower portion 202' in the axial direction of the braking band, i.e., in the direction of the rotation axis of the braking band when forming part of a brake disc 1. In other words, the central portion 200' is interposed between the upper portion 201' and the lower portion 202' in the direction of action of the braking force (i.e., pressure) acting on the outer braking surfaces 2*a*, 2*b* by the friction elements (brake caliper pads).

Preferably, the central portion 200', the upper portion 201', and the lower portion 202' are each a central band, an upper band, and a lower band, respectively, in the sense that each portion extends radially in its entirety into the braking band 2. In other words, each central portion 200', upper portion 201', and lower portion 202' has a footprint in a plane perpendicular to the axial direction that is substantially equal to the footprint of the entire braking band 2, e.g., a discoid or circular crown footprint.

In other words, the braking band 2 is obtained by an upper infiltration (upper portion 201') and a lower infiltration (lower portion 202') of silicon of a single rough preform 20' for a given depth. It is obvious that the infiltration depth is much less than the total thickness of the preform 20', i.e., much less than the height of the side wall.

According to an advantageous embodiment, the upper portion 201' and the lower portion 202' have a thickness of 2 to 4 millimeters, preferably 3 millimeters. This allows for an appropriate compromise between rigidity, wear resistance, and weight to be obtained.

With respect to a braking band made only of aluminum or one of the alloys thereof, the presence of the reinforcement made of ceramic material in the central portion 200' and the presence of the upper portion 201' and the lower portion 202 allow greater hardness, greater rigidity, a higher friction coefficient, and higher wear resistance to be obtained. All these features make this braking band suitable for use for a brake disc.

In this way it is possible to create a braking band with the advantageous features of aluminum (see in particular the lower density with respect to steel and cast iron), but at the same time avoiding the need to provide the braking surfaces with protective coatings, and the limitations and inconveniences thereof, both productive and operational.

The aforesaid ceramic material from which the reinforcement is preferably made is silicon carbide.

As will be taken up later in the description, the MMC composite forming the central portion 200' is obtained by infiltrating a porous ceramic material preform with an aluminum alloy. Advantageously, the ceramic materials listed above, including silicon carbide, are able to withstand the step of infiltrating by the molten metal without altering their chemical and physical structure and without being damaged macroscopically and microscopically to any extent. For this reason, too, they are particularly suitable for making the aforesaid composite.

Preferably, the aluminum alloy is selected from the group of aluminum alloys known to be used for casting, or from the group of aluminum alloys containing at least magnesium, manganese, or silicon.

Advantageously, the aluminum alloy matrix has a homogeneously distributed structure within the composite. As will be discussed below, this may be achieved by infiltrating a preform made of porous ceramic material having a homogeneous porosity throughout its volume with aluminum alloy. The aluminum alloy—due to the infiltration process—permeates the porosity of the ceramic material creating a homogeneous structure.

According to another aspect of this invention, the brake disc 1 provides for the bell 3 to be connected in one piece with the braking band 2 and is composed of an aluminum alloy co-casting with the metal matrix of the composite forming the braking band 2.

As will be taken up hereinafter in the description, the bell 3 is preferably obtained in the same mold wherein the infiltration with aluminum alloy of the preform in ceramic material is carried out, using the same aluminum alloy. In this way, in the same operating step, the forming of the composite material and the fusion of the bell are obtained, achieving a complete union of the two materials.

Making the bell in co-casting with the braking band allows for the production process to be significantly simplified. In fact, it avoids the need to set up both a dedicated production line to produce the bell and an assembly line for assembling the bell on the band.

The combination of the aforesaid two essential aspects of the invention makes it possible to have aluminum-based brake discs that make it possible on the one hand to exploit the special operational features deriving from aluminum (first and foremost the lower density) and on the other hand to have mechanical and wear resistance features comparable to steel or gray cast iron discs, and at the same time may be made with production processes that are as simple and economical as possible.

For simplicity of discussion, the braking band 2 and the brake disc 1 will now be described contextually with their respective methods of fabrication according to this invention. The brake disc 1 is preferably, but not necessarily, made with the method according to the invention which will now be described.

According to a general embodiment of the method according to the invention, the method for making the brake disc 1 comprises a first operating step a) of preparing a mold 10 having an inner cavity 11 comprising a first portion 11a of a shape corresponding to the braking band 2 of the brake disc 1 to be made and a second portion 11b of a shape corresponding to the bell 3 of the brake disc 1 to be made.

Figure 5:
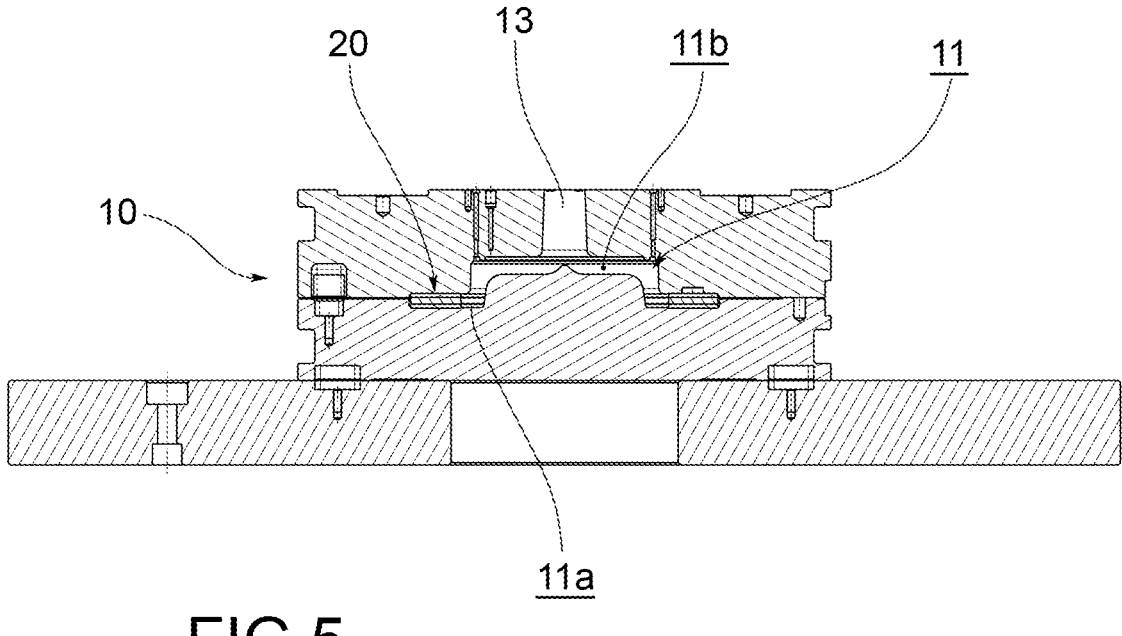
FIG. 5, shows a step in the method of making a brake disc according to an embodiment of the present invention, wherein the steps follow each other in order from FIG. 4 to FIG. 7.
Figure 6:
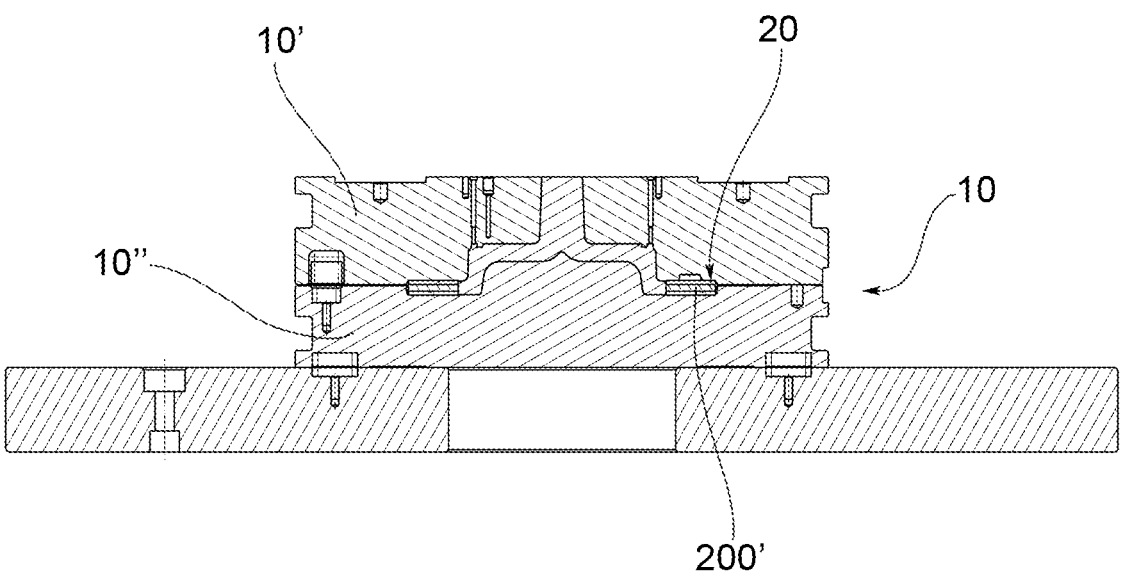
FIG. 6, shows a step in the method of making a brake disc according to an embodiment of the present invention, wherein the steps follow each other in order from FIG. 4 to FIG. 7.
Figure 7:
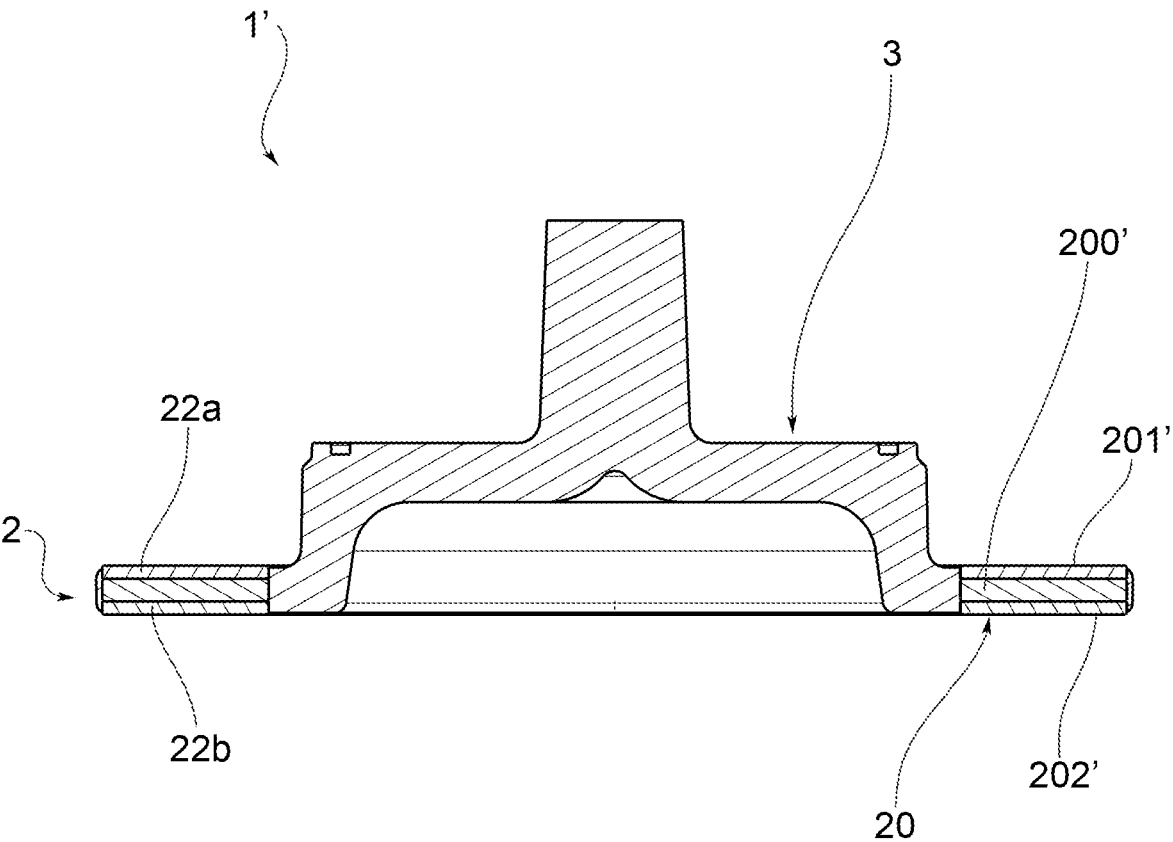
FIG. 7, shows a step in the method of making a brake disc according to an embodiment of the present invention, wherein the steps follow each other in order from FIG. 4 to FIG. 7, and in particular.

The first portion 11a and the second portion 11b of said inner cavity 11 communicate with each other, as illustrated in FIGS. 5 and 6, which schematically illustrate an example of a mold usable in the context of the method according to the invention.

Figure 4:
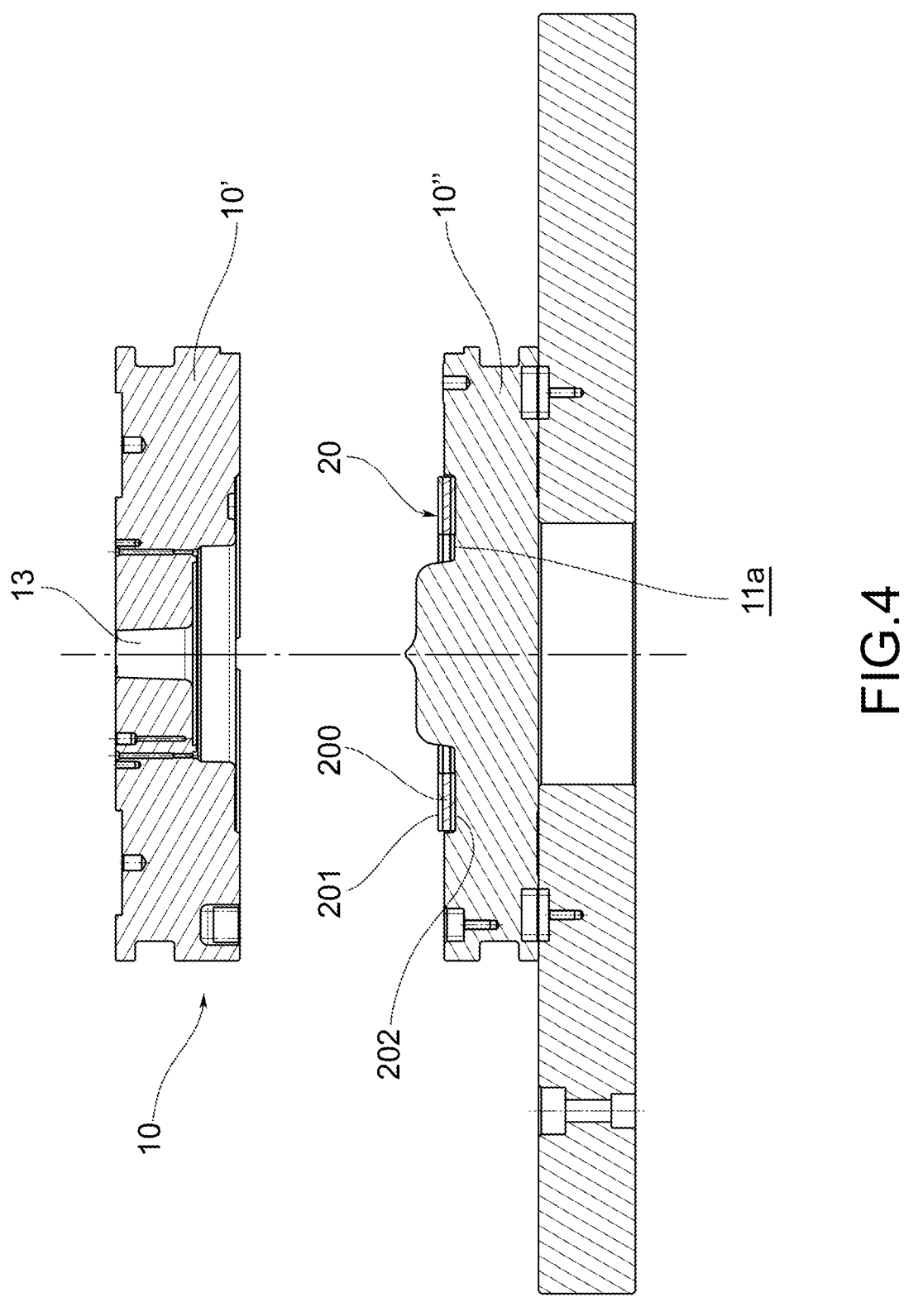
FIGS. 4, shows a step in the method of making a brake disc according to an embodiment of the present invention, wherein the steps follow each other in order from FIG. 4 to FIG. 7.

Advantageously, as illustrated in FIGS. 4 and 5, the mold comprises one or more inlet openings 13 for injecting the aluminum alloy directly into the second portion of the inner cavity 11 of the mold 10. Said inlet opening 13 develops coaxially to the circumferential development of the second portion 11b of a shape corresponding to the bell 3 of the brake disc 1 to be made. Operationally, the injection of the aluminum alloy may therefore be made from the inlet opening 13, from which it subsequently propagates into the first portion 11a.

The method comprises a second operating step b) of preparing a band preform 20 comprising a central layer 200 made of porous ceramic material comprising silicon carbide (SiC), an upper outer layer 201, and a lower outer layer 202. The upper outer layer 201 and the lower outer layer 202 are made of porous ceramic material comprising silicon carbide (SiC) and infiltrated with silicon (SiC+Si). Further, the upper outer layer 201 and the lower outer layer 202 are arranged in an opposing way and on opposite sides of the central layer 200. In other words, the band preform 20 is a multilayer preform, wherein the lower outer layer 201, the central layer 200, and the upper outer layer 201 are arranged on top of each other in order.

As will be better clarified hereinafter, the lower outer layer 201, the central layer 200, and the upper outer layer 201 are preferably obtained from a single rough preform 20' infiltrated above and below.

Advantageously, the infiltration of silicon into the upper outer layer 201 and lower outer layer 202 occupies the spaces in the porous ceramic material, thus preventing, in the subsequent aluminum alloy infiltration step, the aluminum from migrating and infiltrating also into said upper layers 201 and lower layers 202. In this way, the aluminum remains confined to the central layer 200.

Preferably the band preform 20 has a shape substantially the same as the shape of the braking band 2 of the brake disc 1 to be made. For example, it is preferably a disc, preferably a disc with a central circular through opening.

The method further comprises the following additional operating steps:

c) arranging the aforesaid band preform 20 within the mold at the first portion 11a of said inner cavity 11; and d) injecting a liquid or semi-solid aluminum alloy within the entire inner cavity 11 of the mold 10.

The injection of the aluminum alloy is conducted so as to infiltrate with the aforesaid aluminum alloy only the central layer 200 of said band preform 20, obtaining at the first portion 11a an aluminum metal matrix composite reinforced by said central layer 200 that partially defines the braking band 2 of the brake disc to be made. This occurs in such a way as to fill the second portion 11b with the aforesaid aluminum alloy, obtaining an aluminum alloy fusion which is connected in one piece with the braking band 2 made of metal matrix composite, and defines the bell 3 of the brake disc 1 to be made.

According to a general embodiment, the method for making a braking band 2 for a brake disc 1 comprises a sequence of steps similar to the steps of the method for making the brake disc, except for the fact that the mold 10 is shaped for making only the braking band 2 and not for making the bell 3. Consequently, with respect to the steps of the method for making the brake disc, in step a) the mold does not comprise a second portion 11b of a shape corresponding to the bell 3 of the brake disc 1 to be made. Further, with respect to the method for making the brake disc 1, in step d), the infiltration of the aluminum alloy is conducted only so as to infiltrate the central layer 200 of said band preform 20 with the aforesaid aluminum alloy, obtaining in the first portion 11a an aluminum-based metal matrix composite reinforced by the central preform 200 that partially defines the braking band 2 to be made. It is apparent that, for making the braking band only, it is not necessary to provide for the aluminum alloy to fill the second portion 11b, since the simultaneous production of the brake disc bell 2 by confusion is not required. Although the mold for the method for making the braking band is not depicted in the appended figures, how to modify the aforesaid mold 10 so that it is free of the second portion 11b intended for making the bell may be clearly and unequivocally derived by a person skilled in the art.

Thus, in a general embodiment, the method for making the braking band according to this invention comprises a first operating step a) of preparing a mold 10 having an inner cavity 11 comprising a first portion 11a of a shape corresponding to the braking band 2 of the brake disc 1 to be made.

Also in this case, the mold comprises one or more inlet openings 13 for injecting the aluminum alloy directly into the second portion of the inner cavity 11 of the mold 10.

The method comprises a second operating step b) of preparing a band preform 20 comprising a central layer 200 made of porous ceramic material comprising silicon carbide (SiC), an upper outer layer 201, and a lower outer layer 202. The upper outer layer 201 and the lower outer layer 202 are made of porous ceramic material comprising silicon carbide (SiC) and infiltrated with silicon (SiC+Si). Said upper outer layer 201 and said lower outer layer 202 are arranged in an opposing way and on opposite sides of said central layer 200.

The method further comprises the following additional operating steps:

c) arranging the aforesaid band preform 20 within the mold at the first portion 11a of said inner cavity 11; and d) injecting a liquid or semi-solid aluminum alloy within the entire inner cavity 11 of the mold 10.

The injection of the aluminum alloy is conducted so as to infiltrate with the aforesaid aluminum alloy the central layer 200 of said band preform 20, obtaining at the first portion 11a an aluminum metal matrix composite reinforced by the central preform 200 that partially defines the braking band 2 to be made.

Advantageously, for producing the brake disc 1 as well as for producing the braking band 2, step b) of injecting the aluminum alloy within the mold may be conducted following any technique fit for the purpose.

In particular, step b) may be conducted according to a liquid-state infiltration technique, according to a squeeze casting technique, according to a gravity infiltration technique, or according to a semi-solid-state infiltration technique, or by die casting with liquid aluminum.

In the case of gravity infiltration, the infiltration preferably takes place in an inert atmosphere, such as a nitrogen atmosphere.

The aforesaid infiltration techniques are well known to a person skilled in the art and will therefore not be described here.

Preferably, step b) of injecting the aluminum alloy inside the mold is conducted according to a semi-solid infiltration technique. In fact, it has been found that this technique is more suitable for infiltrating ceramic preforms so that at the end of the process the resulting disc made of MMC material has homogeneous features throughout its structure, i.e., the complete infiltration of the preform. At the same time, this technique is particularly suitable for forming the bell within the same process.

More specifically, infiltration at the semi-solid stage occurs at a temperature between the liquidus and solidus line of the aluminum alloy used, i.e., with the alloy in a semi-solid state. Due to the low viscosity of the semi-solid mass, the process of injection into the mold and infiltration occurs smoothly and with low turbulence.

That which is particularly advantageous is that the presence of the upper outer band and the lower outer band, infiltrated with silicon, prevents aluminum from infiltrating said upper and lower outer bands. The result is a pair of opposing braking surfaces 2a, 2b that are particularly suitable for use in a brake disc, as they are free of aluminum and have improved friction coefficients with respect to the prior art for aluminum discs.

Figure 2:
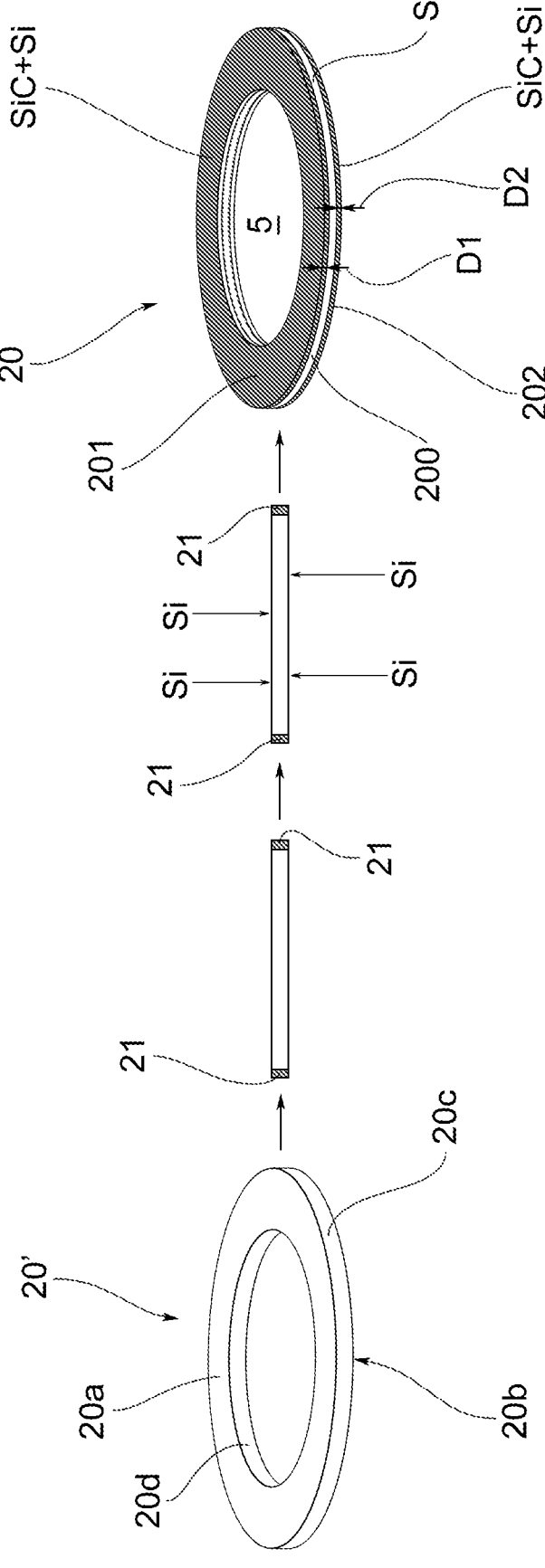
FIG. 2 schematically depicts the steps of the method for making a braking band for a brake disc according to an embodiment of the present invention.
Figure 3:
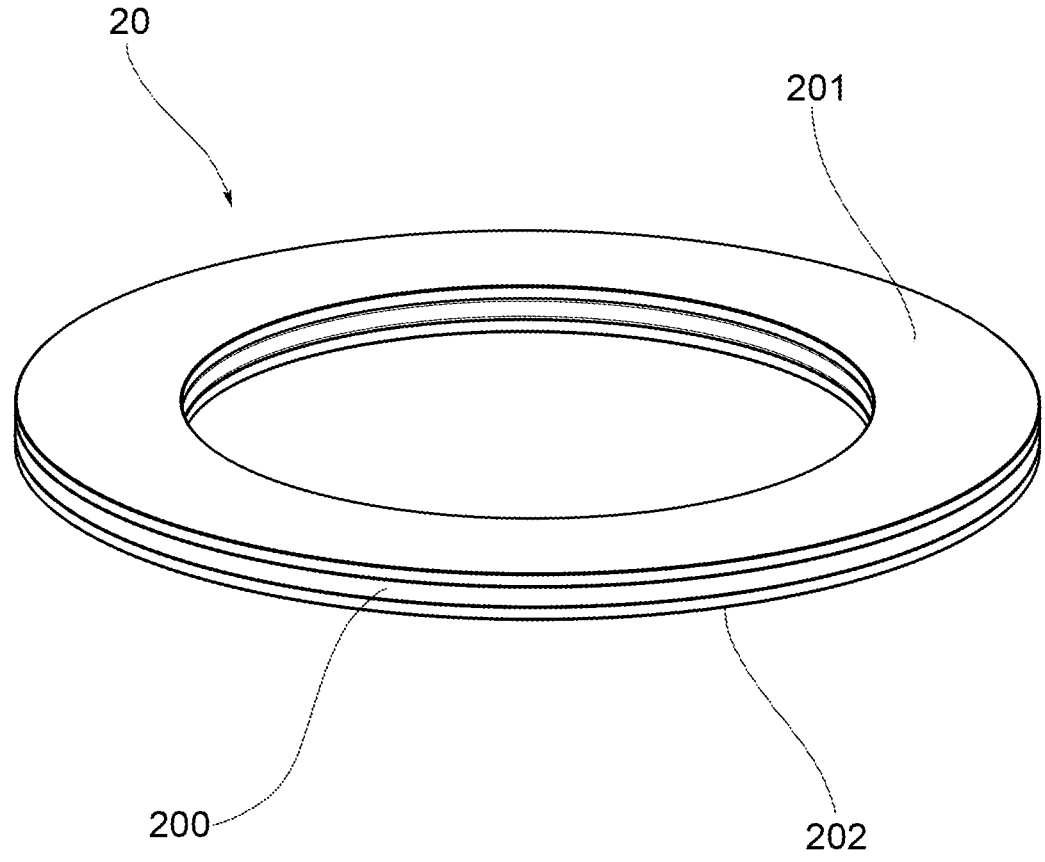
FIG. 3 is a perspective view of a band preform according to an embodiment of the present invention.

According to an advantageous embodiment, both the method for making the braking band and the method for making the brake disc comprise a sequence of operating steps to be executed before step b), for example illustrated schematically in FIG. 2. In particular, the aforesaid sequence of operating steps envisages an initial operating step a1) of preparing a rough preform 20' made of porous ceramic material comprising silicon carbide (SiC). Said rough preform 20' is composed of an upper face 20a and an opposing lower face 20b, joined together by a side wall 20c which develops incidentally, preferably perpendicularly, to the upper face 20a and lower 20b face. Preferably, the rough preform 20' is already provided with a central through hole 5 and thus an inner side wall 20d, opposed to the side wall 20c.

Preferably, the rough preform 20' has a shape substantially equal to the braking band 2 of the brake disc 1 to be made.

Additionally, the aforesaid sequence of operating steps provides for a subsequent operating step a2) of depositing an at least partially masking layer 21 on the side wall 20c, suitable to prevent the infiltration of silicon (Si) in the subsequent step of infiltrating a3) through it.

The infiltration with silicon of said wall 20c, prevents the entry of the aluminum alloy into the preform in the infiltration step of the aluminum alloy.

Preferably, in this step a2) the step of depositing the masking layer 21 comprises the deposition of a boron nitride (BN) layer.

According to an advantageous variant embodiment, the deposition of the masking layer 21 is applied to the entire side wall 20c and is not applied to the upper face 20a and lower face 20b of the rough preform 20'.

According to a further variant, the deposition of the masking layer 21 is applied to the entire inner side wall 20d and is not applied to the upper face 20a and lower face 20b of the rough preform 20'.

According to another variant, the deposition of the masking layer 21 is applied to the entire inner side wall 20d and the side wall 20c.

Due to the masking layer 21, it is advantageously ensured that the silicon does not infiltrate through the side wall 20c and/or the side wall 20d. This allows the aluminum, once the masking layer 21 is removed, to infiltrate in the central layer 200 by passing through the side wall 20c and/or the side wall 20d, depending on how the mold 10 is made.

The aforesaid sequence of operating steps provides for an additional operating step a3) of infiltrating the rough preform 20' with silicon (Si) through the upper face 20a and the lower face 20b to a specified depth, so as to obtain the band preform 20 composed of the central layer 200 not infiltrated with silicon, the upper outer layer 201 infiltrated with silicon (SiC+Si), and the lower outer layer 202 infiltrated with silicon (SiC+Si). The upper outer layer 201 and the lower outer layer 202 are arranged in an opposing way and on opposite sides of the central layer 200.

Preferably, in this step a3) the rough preform 20' is placed in a crucible, a predetermined amount of silicon (Si) powder is added to the crucible and the rough preform 20' is heated to a temperature above 1420° C. for at least 5 minutes, at an atmospheric pressure and in an inert atmosphere, preferably in an argon atmosphere.

The process may be accomplished using appropriately sized industrial furnaces. Additionally, preferably, following the infiltration process, the upper and lower outer preforms are leveled (ground) before being subjected to the subsequent steps described below.

According to one embodiment of the method, the rough preform 20' is heated to a temperature ranging from 1500° C. to 1650° C. for a time interval of 15 to 90 minutes.

More advantageously, the rough preform 20' is heated to a temperature ranging from 1550° C. to 1600° C. for a time interval of between 30 and 60 minutes, allowing for adequate and homogeneous silicon infiltration to be obtained for a thickness suitable for manufacturing the brake disc and, surprisingly, with a more homogeneous propagation front.

Preferably, the rough preform 20' has a thickness, i.e., a distance between the upper face 20a and the lower face 20b, of between 4 and 40 millimeters extremes included, even more preferably between 10 and 20 millimeters, and the predefined amount of silicon depends on the diameter of the preform.

For example, the volume of the layer to be infiltrated with silicon may be calculated as: $Vtot=r(R2−r2)h$, where radii R and r are the outer radius R and inner radius r, respectively, of the circular crown described by the rough preform 20', and h is the desired silicon infiltration depth. The apparent density defined as $Da$=mass of porous artifact/total volume of porous artifact (including voids), and the porosity defined as $P=1−Dsolid/Da,$ where the solid density Dsolid is the density of the non-porous artifact,
the predefined amount of silicon (Msi) may be calculated as:

$Msi$=silicon volume×silicon density, where silicon volume=Vtot·P.

In this way, given a preform with a certain porosity and a certain volume of the layer to be infiltrated with silicon, it is possible to define a priori the mass of silicon to be used.

According to a preferred embodiment of the method for making the braking band 2 or the method for making the brake disc 1, the rough preform 20' made of porous ceramic material is obtained by subjecting a mass of ceramic material granules, superficially coated with a polymeric binding composition, to the following sequential operating steps: molding, debonding (or dewaxing), and sintering.

Advantageously, the aforesaid ceramic material granules are powder granules known as "ready-to-press." This kind of commercially available powder, together with the pressing technique allows "net shape molded" products to be obtained, without the need of other components or additives beyond the powders themselves.

Preferably, the aforesaid ceramic material from which the granules are formed is silicon carbide.

Preferably, the polymeric binding composition that coats the ceramic material granules is chosen from the group consisting of thermoplastic and thermosetting polymers.

Preferably, the molding of the mass of ceramic material granules is done uniaxially or isostatically or using any other technique that allows for a preform of such a size and shape to be obtained.

At the end of the molding process, an aggregate of the aforesaid ceramic material granules is obtained, connected by ceramic microstructures facilitated by the respective coatings of polymeric binding composition. Said aggregate contains organic residues from the granule coatings. These organic residues are removed in the debonding (or dewaxing) step.

Advantageously, debonding is conducted under air flow conditions at a temperature below 700° C. until the organic phase present in the mass of ceramic material granules after molding is fully eliminated.

According to a variant, debonding is conducted under inert atmospheric conditions.

At the end of the debonding step, a green body is obtained, consisting essentially only of ceramic material. This green body is then subjected to the sintering phase that transforms the green body into a continuous structure obtained by the formation of bridges connecting the individual ceramic particles. This results in a body that exhibits homogeneous properties throughout the structure.

Preferably, the sintering is conducted in two separate sintering cycles. A first sintering cycle is conducted at a temperature of not less than 1600° C., preferably about 1800° C., and a second sintering cycle is conducted at a temperature of not less than 2000° C., preferably in the range of 2100° C.-2200° C., both under an inert atmosphere.

Advantageously, the resulting rough preform 20' made of porous ceramic material has a distribution of density and porosity that is homogenous throughout the volume thereof. Said features make the preform suitable for making a homogeneously distributed aluminum alloy matrix following its infiltration with said alloy.

According to a specific embodiment, the method of making the braking band provides that the rough preform 20' has a density of 40%. In this embodiment a 13 mm high rough preform is placed within a graphite crucible with silicon powder on the upper and lower outer surfaces, weighing between 10 and 20 grams and with a masking layer 21 of boron nitride on the side wall 2c. The preform is subjected to a thermal cycle in a furnace for the fusion and infiltration of silicon in flowing argon at atmospheric pressure with a temperature between 1430° C. and 1550° C. for a time between 1 hour and 3 hours. Advantageously, in the case of a temperature of 1550° C. for a time of 60 minutes, with an amount of silicon of 14 grams, an average thickness of the upper and lower outer layer between 2 and 3 millimeters is obtained (minimum 2 mm, preferably maximum 2.6 mm).

Obviously, once the band preform 20 is obtained as described above, the central layer 200 corresponds to the central portion 200' of the braking band 20 and the upper 201 and lower 202 outer layer correspond to the upper outer band 201' and lower outer band 202' of the braking band 20, respectively.

Advantageously, in step d) of the method according to this invention, as visible, for example, in FIG. 5 to 6, the mold closes over the upper outer layer 201 and the lower outer layer 202 in such a way that during the injection of aluminum into the mold, the infiltration of aluminum over the upper 201 and lower 202 outer layer is prevented, so that the outer braking surfaces 2a, 2b of the disc are free of aluminum. In other words, the aluminum alloy is prevented from flowing and creeping over the upper 201 and lower 202 outer layer, i.e., on the side of each outer layer 201, 202 not joined to the central layer 200.

As may be appreciated from that which has been described, the braking band, the brake disc and the methods for making said brake disc and said braking band according to the invention make it possible to overcome the drawbacks presented in the prior art.

In a particularly innovative manner, in fact, the braking band and brake disc of this invention, by interposing two outer braking bands made of ceramic material between the brake pads and the central portion made of composite material with a metal matrix made of MMC (metal matrix composite) aluminum alloy, allows the problems related to local degradation due to overheating of the aluminum, found in the prior art to be reduced—if not eliminated. In addition, the outer braking bands allow for the simultaneous development of greater braking force, due to the coupling of the pads on a material with a higher friction coefficient. At the same time, efficiency, simplicity, low implementation cost and reduced corrosion problems are ensured. Reduced corrosion is particularly advantageous in electric vehicles, where the introduction of regenerative braking involves discontinuous use of the disc brake, which may lead to corrosive phenomena.

A person skilled in the art, in order to satisfy contingent and specific needs, may make numerous modifications and variations to the invention described above, which modifications and variations are all contained within the scope of the invention as defined in the following claims.

The invention claimed is:

1. A method for making a braking band for a brake disc for a disc brake, said method comprising the following steps:
   a) preparing a mold having an inner cavity, which comprises a first portion of a shape corresponding to the braking band to be made;
   b) preparing a band preform comprising a central layer made of porous ceramic material comprising silicon carbide, an upper outer layer and a lower outer layer, said upper outer layer and said lower outer layer being made of porous ceramic material comprising silicon carbide and being infiltrated with silicon, said upper outer layer and said lower outer layer being arranged oppositely and on opposite sides of the central layer;
   c) placing said band preform inside the mold at the first portion of said inner cavity; and
   d) injecting a liquid or semi-solid aluminum alloy inside the entire inner cavity of the mold to infiltrate with said aluminum alloy only the central layer of said band preform made of porous ceramic material, obtaining at the first portion an aluminum metal matrix composite reinforced by said central layer which partially defines the braking band to be made.

2. Method according to claim 1, wherein, before step b), for making the band preform the method comprises the steps of:
   a1) arranging a rough preform, made of porous ceramic material comprising silicon carbide, said rough preform having an upper face and an opposite lower face, joined together by a side wall, which develops incident to the upper face and lower face;
   a2) depositing a masking layer at least partially on the side wall, suitable for preventing the infiltration of silicon in the subsequent step of infiltrating through it;
   a3) infiltrating the rough preform with silicon through the upper face and the lower face to a given depth, so as to obtain the band preform consisting of a central layer not infiltrated with Si, an upper outer layer infiltrated with silicon and a lower outer layer infiltrated with silicon, said upper outer layer and said lower outer layer being arranged in an opposing manner and on opposite sides of the central layer.

3. Method according to claim 2, wherein in step a2), the step of depositing the masking layer comprises the deposition of a layer of boron nitride.

4. Method according to claim 2, wherein in step a2), the depositing of the masking layer is applied to the entire side wall and is not applied to the upper face and lower face of the rough preform.

5. Method according to claim 2, wherein in step a3), the rough preform is positioned in a crucible, a predefined amount of silicon powder is added to the crucible and the rough preform is heated to a temperature above 1414° C. for at least 5 minutes, at an atmospheric pressure and in inert atmospheres.

6. Method according to claim 5, wherein the rough preform is heated to a temperature between 1500° C. and 1650° C. for an interval of time comprised between 15 and 90 minutes.

7. Method according to claim 6, wherein the rough preform is heated to a temperature between 1550° C. and 1600° C. for an interval of time comprised between 30 and 60 minutes.

8. Method according to claim 5, wherein the rough preform has a thickness, i.e., a distance between the upper face and the lower face comprised between 4 and 40 millimeters, extremes included, and the predefined amount of silicon is a function of the diameter of the preform.

9. Method according to claim 1, wherein step d) of introducing the aluminum alloy inside the mold is performed according to a semi-solid or liquid infiltration technique or according to a gravity infiltration technique, or by die casting with liquid aluminum or according to a squeeze casting technique.

10. Method according to claim 1, wherein the rough preform is obtained by sequentially subjecting to molding, dewaxing and sintering a mass of ceramic material granules superficially coated with a polymeric binding composition.

11. Method according to claim 10, wherein said sintering is conducted in two separate sintering cycles, wherein a first sintering cycle is conducted at a temperature of not less than 1600° C. and a second sintering cycle is conducted at a temperature of not less than 2000° C., both in an inert atmosphere.

12. Method according to claim 1, wherein in step d), the mold closes over the upper outer layer and the lower outer layer of the band preform so that, during the introduction of aluminum into the mold, the infiltration of aluminum over the upper outer layer and under the lower outer layer is prevented, so that the outer braking surfaces of the braking band are free of aluminum.

13. Method for making a brake disc, said brake disc comprising a braking band and a bell, said method comprising the following steps:
   a) preparing a mold having an inner cavity which comprises a first portion of a shape corresponding to the braking band of the brake disc to be made, and a second portion of a shape corresponding to the bell of the brake disc to be made, wherein the first portion and the second portion of said inner cavity are communicating with each other;
   b) preparing a band preform comprising a central layer made of porous ceramic material comprising silicon carbide, an upper outer layer and a lower outer layer, said upper outer layer and said lower outer layer being made of porous ceramic material comprising silicon carbide and infiltrated with silicon, said upper outer layer and said lower outer layer being arranged oppositely and on opposite sides of the central layer;
   c) placing said band preform inside the mold at the first portion of said inner cavity; and d) injecting a liquid or semi-solid aluminum alloy inside the entire inner cavity of the mold to infiltrate with said aluminum alloy only the central layer of said band preform made of porous ceramic material, obtaining at the first portion an aluminum metal matrix composite reinforced by said central layer which partially defines the braking band of the brake disc to be made, and so as to fill with said aluminum alloy the second portion obtaining an aluminum alloy fusion which is connected in one piece with the braking band made of metallic matrix composite and defines the bell of the brake disc to be made.

14. A braking band for a brake disc for a disc brake, said braking band consisting of:

a central portion made of an aluminum metal matrix composite reinforced with ceramic material comprising silicon carbide, said composite being obtained by infiltrating with an aluminum alloy a central layer made of porous ceramic material comprising silicon carbide of a rough preform, an upper portion, which is joined to the central portion, said upper portion being made of porous ceramic material comprising silicon carbide and infiltrated with silicon and covering the central portion on one side thereof, a lower portion, which is joined to the central portion on the opposite side, i.e. opposite, with respect to the upper portion, said lower portion being made of porous ceramic material comprising silicon carbide and infiltrated with silicon and covering the central portion on the other side, i.e. opposite with respect to the upper portion.

15. Braking band according to claim 14, wherein the upper portion and the lower portion have a thickness between 0.5 and 4 millimeters.

16. Brake disc for a disc brake, comprising a braking band and a bell connected to said braking band, the braking band consisting of:

a central portion made of an aluminum metal matrix composite reinforced with ceramic material comprising silicon carbide, said composite being obtained by infiltrating with an aluminum alloy a central layer made of porous ceramic material comprising silicon carbide of a rough preform, an upper portion, which is joined to the central portion, said upper portion being made of porous ceramic material comprising silicon carbide and infiltrated with silicon and covering the central portion on one side thereof, a lower portion, which is joined to the central portion on the opposite side, i.e. opposite, with respect to the upper portion, said lower portion being made of porous ceramic material comprising silicon carbide and infiltrated with silicon and covering the central portion on the other side, i.e. opposite with respect to the upper portion.

17. Brake disc for a disc brake according to claim 16, wherein the bell is connected in one piece to the braking band and consists of an aluminum alloy co-casting with the metallic matrix of the composite, which constitutes the braking band.

18. Brake disc according to claim 16, wherein the aluminum alloy matrix has a homogeneously distributed structure inside said composite.

\* \* \* \* \*